(12) United States Patent
Vulgarakis Feljan et al.

(10) Patent No.: US 10,820,250 B2
(45) Date of Patent: Oct. 27, 2020

(54) METHOD AND PLATOON MANAGER FOR ENABLING A WIRELESS DEVICE IN A VEHICLE TO COMMUNICATE OVER A CELLULAR NETWORK

(71) Applicant: Telefonaktiebolaget LM Ericsson (publ), Stockholm (SE)

(72) Inventors: Aneta Vulgarakis Feljan, Stockholm (SE); Mona Matti, Nacka (SE); Azadeh Bararsani, Solna (SE); Leonid Mokrushin, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 16/099,890

(22) PCT Filed: May 31, 2016

(86) PCT No.: PCT/SE2016/050509
§ 371 (c)(1),
(2) Date: Nov. 8, 2018

(87) PCT Pub. No.: WO2017/209666
PCT Pub. Date: Dec. 7, 2017

(65) Prior Publication Data
US 2019/0141603 A1    May 9, 2019

(51) Int. Cl.
*H04W 40/20* (2009.01)
*H04W 4/46* (2018.01)
(Continued)

(52) U.S. Cl.
CPC ............ *H04W 40/20* (2013.01); *G06F 21/35* (2013.01); *G08G 1/00* (2013.01); *G08G 1/22* (2013.01);
(Continued)

(58) Field of Classification Search
CPC ............ H04W 4/40; H04W 4/44; H04W 4/46; H04W 8/005; H04W 8/082; H04W 8/20;
(Continued)

(56) References Cited

U.S. PATENT DOCUMENTS 8,514,825 B1 *  8/2013  Addepalli ......... H04W 72/0406
                                              370/338
9,396,661 B2 *  7/2016  Okamoto ................. G08G 1/22
(Continued)

FOREIGN PATENT DOCUMENTS

JP        5134656 B2     1/2013
WO    2015032436 A1     3/2015
(Continued)

OTHER PUBLICATIONS

Araniti, Giuseppe, et al., "LTE for Vehicular Networking: A Survey," IEEE Communications Magazine, vol. 51, No. 5, May 2013, pp. 148-157.
(Continued)

*Primary Examiner* — Luat Phung
*Assistant Examiner* — Thomas R Cairns
(74) *Attorney, Agent, or Firm* — Withrow & Terranova, PLLC

(57) ABSTRACT

A method and a platoon manager for enabling a first wireless device located in a first vehicle to communicate over a cellular network when the first wireless device has no connection to the cellular network. After identifying a vehicle platoon to which the first vehicle belongs, a relay vehicle is found in the vehicle platoon where a second wireless device is located that has a connection to the cellular network. The second wireless device is then instructed to act as a relay to the cellular network for the
(Continued)

communication with the first wireless device by means of a wireless Device-to-Device (D2D) link between the first and second wireless devices.

22 Claims, 4 Drawing Sheets

(51) Int. Cl.

| | |
|---|---|
| *G08G 1/00* | (2006.01) |
| *G06F 21/35* | (2013.01) |
| *H04W 4/40* | (2018.01) |
| *H04W 8/00* | (2009.01) |
| *H04W 8/08* | (2009.01) |
| *H04W 8/20* | (2009.01) |
| *H04W 8/26* | (2009.01) |
| *H04W 40/06* | (2009.01) |
| *H04W 4/44* | (2018.01) |
| *H04W 92/18* | (2009.01) |
| *H04W 76/14* | (2018.01) |
| *H04W 88/04* | (2009.01) |

(52) U.S. Cl.
CPC ............... *H04W 4/40* (2018.02); *H04W 4/46* (2018.02); *H04W 8/005* (2013.01); *H04W 8/082* (2013.01); *H04W 8/20* (2013.01); *H04W 8/26* (2013.01); *H04W 40/06* (2013.01); *G06F 2221/2115* (2013.01); *H04W 4/44* (2018.02); *H04W 76/14* (2018.02); *H04W 88/04* (2013.01); *H04W 92/18* (2013.01)

(58) Field of Classification Search
CPC ....... H04W 8/26; H04W 40/06; H04W 40/20; H04W 76/14; H04W 88/04; H04W 92/18; G06F 21/35; G06F 2221/2115; G08G 1/00; G08G 1/22
See application file for complete search history.

(56) References Cited

U.S. PATENT DOCUMENTS

| | | |
|---|---|---|
| 2004/0063451 A1 | 4/2004 | Bonta et al. |
| 2012/0165006 A1 | 6/2012 | Ge et al. |
| 2013/0325940 A1 | 12/2013 | Foti |
| 2014/0316865 A1 | 10/2014 | Okamoto |
| 2015/0296019 A1 | 10/2015 | Onishi et al. |

FOREIGN PATENT DOCUMENTS

| | | |
|---|---|---|
| WO | 2015064074 A1 | 5/2015 |
| WO | 2015128537 A1 | 9/2015 |
| WO | 2015176831 A1 | 11/2015 |
| WO | 2016015764 A1 | 2/2016 |

OTHER PUBLICATIONS

Remy, Guillaume, et al., "LTE4V2X: LTE for a Centralized VANET Organization," Proceedings of the 2011 IEEE Gobal Telecommunications Conference—GLOBECOM 2011, Kathmandu, 2011, 6 pages.

International Search Report and Written Opinion for International Patent Application No. PCT/SE2016/050509, dated Feb. 6, 2017, 10 pages.

Shao, C. et al., "Performance Analysis of Connectivity Probability and Connectivity-Aware MAC Protocol Deisgn for Platoon-Based VANETs," IEEE Transactions on Vehicular Technology, vol. 64, No. 12, Dec. 2015, IEEE, pp. 5596-5609.

Extended European Search Report for European Patent Application No. 16904181.1, dated Nov. 22, 2019, 6 pages.

* cited by examiner

METHOD AND PLATOON MANAGER FOR ENABLING A WIRELESS DEVICE IN A VEHICLE TO COMMUNICATE OVER A CELLULAR NETWORK

This application is a 35 U.S.C. § 371 national phase filing of International Application No. PCT/SE2016/050509, filed May 31, 2016, the disclosure of which is incorporated herein by reference in its entirety.

TECHNICAL FIELD

The present disclosure relates generally to a method and a platoon manager, for enabling a first wireless device located in a first vehicle to communicate over a cellular network when the first wireless device has no connection to the cellular network.

BACKGROUND

Vehicles in the future are likely to have capability to be driven with the assistance of semi- or fully autonomous functionality, which enables the vehicles to join and be part of a vehicle platoon that is more or less automatically controlled to drive together as a group in a coordinated manner. Platooning thus refers to a mode of operation where a group of vehicles can travel together very close to each other, and they can autonomously steer, accelerate and brake in a coordinated manner, as controlled by means of a lead vehicle of the platoon. Such a platoon can generally be formed whenever there are enough vehicles to motivate the use of the platooning mode.

There are several advantages that can be achieved by platooning. First, the space between adjacent vehicles in the platoon can be safely controlled with great precision so that the vehicles can drive very close to one another even at relatively high speed. This has the advantage of occupying less space as well as saving energy and fuel by utilizing the aerodynamic "pull" which occurs closely behind an adjacent front vehicle, especially at high speed. Second, the traffic flow can also be greatly improved by controlling all vehicles in the platoon to accelerate and break simultaneously and the closest safety distance between vehicles can be much smaller than when the vehicles are individually controlled by humans.

The platooning mode typically involves some short range wireless communication between the vehicles, commonly referred to as Device-to-Device, D2D, communication, used for propagating various information and driving commands amongst the vehicles as needed to achieve the coordinated driving. It is assumed that all vehicles described herein have a wireless device or the equivalent which is configured to provide the necessary communication for platooning. The wireless device may be a separate communication entity such as a mobile phone or similar which is connected to the vehicle's driving functions, or it may be integrated in the vehicle, depending on the implementation.

The wireless device in a vehicle belonging to a vehicle platoon may also be used for communication over a cellular network, e.g. when a calling party sends a call request directed to the wireless device. However, it may happen that the called wireless device has currently no connection to the cellular network and can therefore not be reached. Similarly, a person using the wireless device is not able to make calls or access the Internet in this case. There may be several reasons for not having a connection to the cellular network, e.g. high load on the network, poor radio conditions and equipment malfunction, or the wireless device may not have capabilities for communicating with a cellular network whatsoever. It is thus a problem that no communication can be made to or from the wireless device, apart from the D2D communication used for operating in the platooning mode, in case the wireless device has no connection to the cellular network.

SUMMARY

It is an object of embodiments described herein to address at least some of the problems and issues outlined above. It is possible to achieve this object and others by using a method and a platoon manager as defined in the attached independent claims.

According to one aspect, a method is performed for enabling a first wireless device located in a first vehicle to communicate over a cellular network when the first wireless device has no connection to the cellular network. In this method, a vehicle platoon to which the first vehicle belongs is identified, and a relay vehicle is found in the vehicle platoon where a second wireless device is located that has a connection to the cellular network. The second wireless device is then instructed to act as a relay to the cellular network for the communication with the first wireless device by means of a wireless Device-to-Device, D2D, link between the first and second wireless devices.

According to another aspect, a platoon manager is arranged to enable a first wireless device located in a first vehicle to communicate over a cellular network when the first wireless device has no connection to the cellular network. The platoon manager is configured to identify a vehicle platoon to which the first vehicle belongs, and to find a relay vehicle in the vehicle platoon where a second wireless device is located that has a connection to the cellular network. The platoon manager is also configured to instruct the second wireless device to act as a relay to the cellular network for the communication with the first wireless device by means of a wireless Device-to-Device, D2D, link between the first and second wireless devices.

Advantages of the above method and platoon manager include that the first wireless device in the first vehicle included in the platoon is able to communicate over the cellular network by using the second wireless device as a relay, even though the first wireless device itself has no connection to the network. A calling party is also able to reach the first wireless device by means of the second wireless device's connection to the cellular network and the D2D link between the first and second wireless devices.

The above method and platoon manager may be configured and implemented according to different optional embodiments to accomplish further features and benefits, to be described below.

A computer program storage product is also provided comprising instructions which, when executed on at least one processor, cause the at least one processor to carry out the method described above.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable a first wireless device when being located in a first vehicle, to communicate over a cellular network even when the first wireless device itself has no connection to the cellular network. This can be achieved by identifying a vehicle platoon that the first wireless device belongs to, and using a second wireless device, which is located in another vehicle in the platoon and has a connection to the cellular network, as a relay to the cellular network by means of a D2D link between the first and second wireless devices. The term "D2D link" used in this disclosure may be any wireless connection between wireless devices in the respective vehicles which can be used for short range wireless communication, e.g. a D2D connection that is also useful for propagating various information and driving commands between the vehicles as needed to achieve coordinated driving in the above-described platooning mode.

The D2D link described herein may alternatively be referred to as a short range link, a local link, or similar.

In the following examples, it is assumed that a wireless device is present in each vehicle and configured to send and receive information in the manner described herein. The wireless device in each vehicle may be a separate communication entity such as a mobile phone, or it may be integrated in the vehicle, depending on the implementation. Thus, when it is said that a vehicle sends or receives information or a message, it should be understood that a wireless device in the vehicle is used for the communication.

Figure 1:
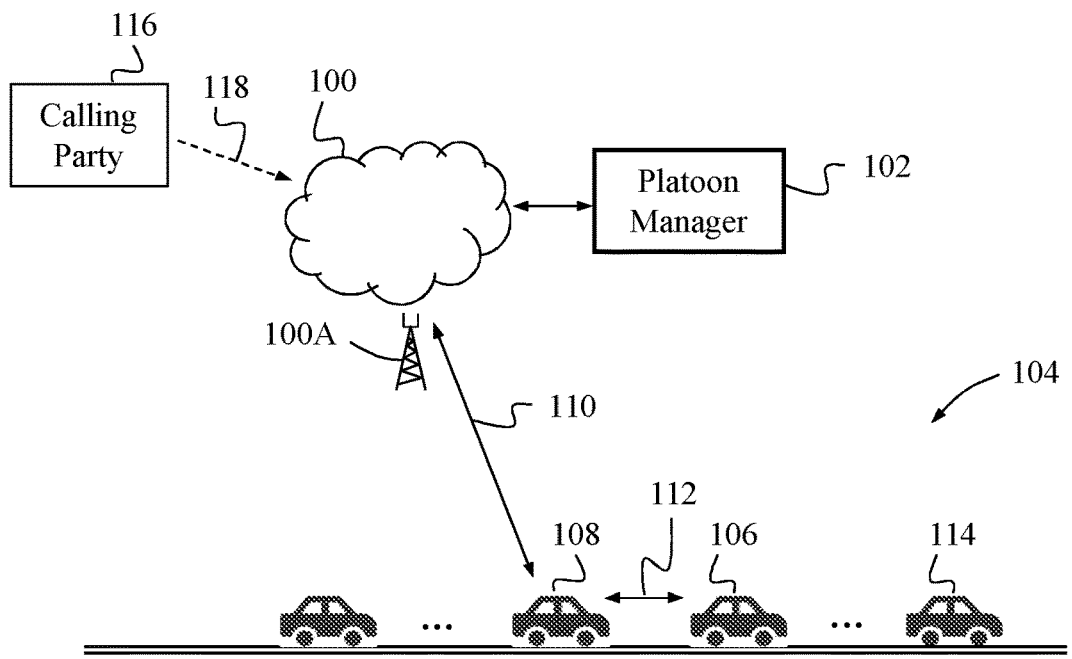
FIG. 1 is a communication scenario illustrating an example of how the solution may be employed, according to some possible embodiments.
Figure 1A:
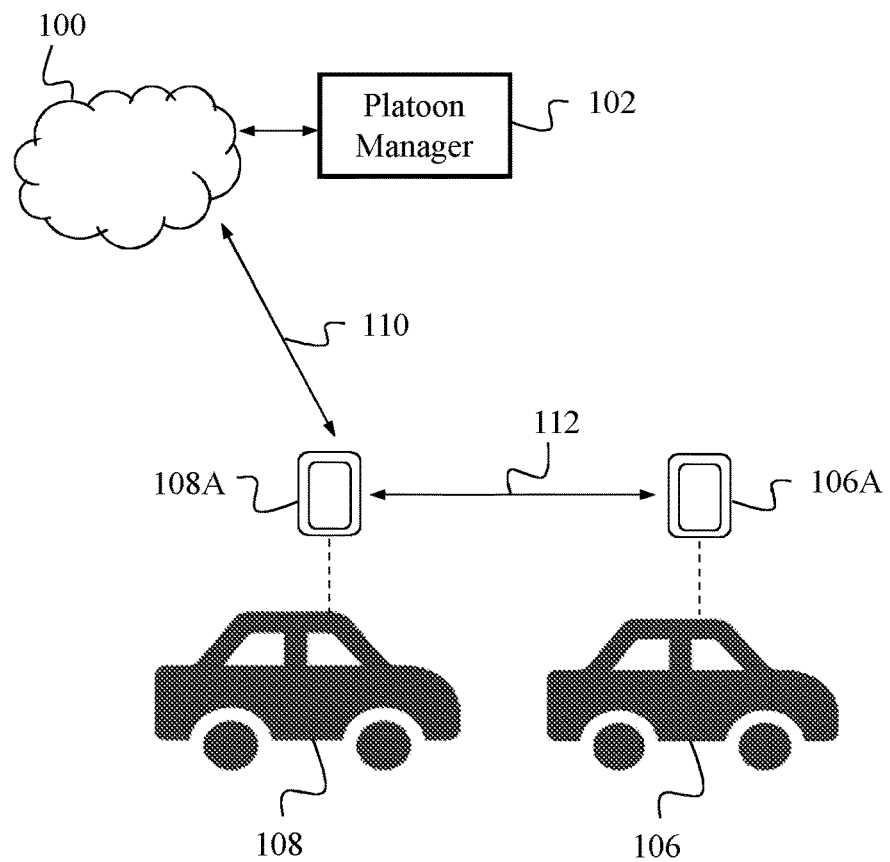
FIG. 1A is a more detailed illustration of the communication scenario in FIG. 1.

An example of communication when the above procedure is employed is shown in FIG. 1 where a set of vehicles are operating in the above-described platooning mode while driving together in a coordinated manner on a road, the vehicles thus belonging to a vehicle platoon 104. Reference will also be made to FIG. 1A which illustrates parts of FIG. 1 in more detail. The vehicle platoon 104 comprises a first vehicle 106 in which a first wireless device 106A is present. The solution and embodiments described herein are directed to enable the first wireless device 106A to communicate over a cellular network 100 even though device 106A has no connection to the cellular network 100. It is nonetheless assumed that the first wireless device 106A is capable of D2D communication with wireless devices in other vehicles of the platoon 104, which is indeed required for operating in the platooning mode.

The solution and embodiments thereof will be described herein basically in terms of functionality in a platoon manager 102 which is a logical node connected to the cellular network 100 for communication with the vehicles. The platoon manager 102 may be implemented in a server or the like which is operable in a cloud environment. In the field of data and telecommunication, "the cloud" is generally known as a set of processing and storing resources, which are typically available for hire on demand. The term "platoon manager" is used herein to indicate that it has functionality for arranging a communication for a wireless device in a vehicle of a platoon in the manner described. Alternative terms that could be used instead of platoon manager may include platoon server, platoon controller, communication manager, cloud service node or manager, etc.

The platoon manager 102 basically operates to identify the vehicle platoon 104 and to find a second wireless device 108A located in another vehicle 108 in the platoon which has a connection 110 to the cellular network 100, so that the second wireless device 108A can act as a relay to the cellular network 100 by means of a D2D link 112 between the first and second wireless devices 106, 108 and the connection 110 which is served by a base station 100A or the like. The vehicle 108 that contains the second wireless device 108A will be referred to as a relay vehicle in this description.

The term cellular network is used herein to represent any network infrastructure that comprises network nodes such as base stations, eNodeBs, access nodes or the like depending on the type of network and terminology, which provide radio connectivity for wireless devices in different areas commonly referred to as cells. The wireless devices which are present in the vehicles of the platoon 104 may thus be able to communicate with other parties and the Internet over the cellular network 100. It was mentioned above, however, that a wireless device may not have any connection to the cellular network 100, e.g. because of high load on the network 100, poor radio conditions, equipment malfunction, or lack of capabilities in the wireless device.

FIGS. 1 and 1A illustrate that the cellular network 100 receives a call request 118 originating from a calling party 116 and being directed to the first wireless device 106A. When detecting that the first wireless device 106A has no connection to the cellular network 100, the platoon manager 102 is triggered to identify the vehicle platoon 104, find the second wireless device 108A and instruct it to act as a relay to the cellular network 100 by means of the D2D link 112. For example, the cellular network 100 may have a function that is able to detect or find out that the first wireless device 106A is not available through the cellular network 100, and to forward the call request 118 to the platoon manager 102 for finding a relay to enable the call, if possible.

The platoon manager 102 is able to identify the platoon and find the relay vehicle based on platoon information which may be obtained from a vehicle 114 in the vehicle platoon which is configured to collect and provide such platoon information, herein referred to as the leader vehicle. The term "leader vehicle" is thus used in this description merely to indicate that this vehicle has been appointed in the platoon to provide the platoon information. In this context the platoon information identifies the vehicles that are comprised in the platoon and their relative positions, and it also identifies which wireless devices are used for operating in the platooning mode, among other things. Thereby, it is possible to locate a wireless device in a vehicle of the platoon based on such platoon information. Alternatively, the platoon manager 102 may "find" the relay vehicle when suggested from a vehicle in the vehicle platoon.

After finding a suitable relay vehicle 108 in the platoon, the second wireless device 108A therein is thus instructed to act as a relay by using the D2D link 112 and its own connection 110 to the cellular network 100. In this solution, it is thus an advantage that the first wireless device 106A in vehicle 106 can communicate over the cellular network 100 by using the second wireless device 108A as a relay, even though the first wireless device 106A itself has no connection to the network 100.

An example of how the solution may be employed will now be described, with reference to the flow chart in FIG. 2, in terms of actions for enabling a first wireless device located in a first vehicle to communicate over a cellular network when the first wireless device has no connection to the cellular network. Some optional example embodiments that could be used in this procedure will also be described. Reference will also be made, without limiting the described features and embodiments, to the example scenarios shown in FIGS. 1 and 1A. The procedure illustrated in FIG. 2 may in one example embodiment be performed by a platoon manager 102 when being connected to the cellular network 100.

A first action 200 illustrates that a vehicle platoon 104 to which the first vehicle 106 belongs is identified. In an example embodiment, the vehicle platoon 104 may be identified based on platoon information obtained from a leader vehicle 114 in the vehicle platoon, said platoon information indicating at least which vehicles are currently included in the platoon. The platoon information also indicates or identifies the wireless devices that are present and operating in the respective vehicles, e.g. by including a network address of each wireless device. FIG. 1 illustrates that the leader vehicle 114 is driving in a foremost position of the platoon 104, although it could just as well drive in any position within the platoon.

It should be noted that the leader vehicle 114 as defined in this disclosure does not necessarily operate as a platoon leader in the conventional sense which involves collecting vehicle measurements and generating driving commands, which is outside the scope of the solution described herein. Here it is merely assumed that the leader vehicle 114 is able to provide the platoon information to the platoon manager 102, e.g. by means of a suitable platoon reporting message transmitted over the cellular network 100. In this communication any of the following protocols may, without limitation, be used: the Hyper-Text Transfer Protocol, HTTP, the User Datagram Protocol, UDP, the Transmission Control Protocol, TCP, and the Real-time Transport Protocol, RTP. Basically, any of the vehicles in the platoon 104 having the necessary capabilities for collecting and providing the platoon information may be appointed to act as the leader vehicle in this context. The process of appointing the leader vehicle is however outside the scope of this solution.

In a next action 202, a relay vehicle 108 is found in the vehicle platoon where a second wireless device 108A is located that has a connection 110 to the cellular network. This may be done in some different ways as follows. In one example embodiment, the relay vehicle 108 may be found when suggested from a vehicle in the vehicle platoon, such as the leader vehicle 114. In this case the vehicle 108 may have been selected by the leader vehicle 114 or negotiated by the vehicles in the platoon, to act as the relay for the communication with the device 106A in vehicle 106.

In another example embodiment, the relay vehicle 108 may be appointed, e.g. by the platoon manager 102, based on the obtained platoon information. It was mentioned above that such platoon information identifies the vehicles that are comprised in the platoon and their relative positions as well as the wireless devices that are operating in the vehicles, among other things. The platoon information may further include information about the respective wireless devices' connections to the cellular network, e.g. indicating how reliable or useful the connections are at the moment which may be reported from the vehicles to the leader vehicle 114. When using the foregoing example embodiment, further example embodiments may be that the relay vehicle 108 is appointed when the platoon information indicates that the relay vehicle 108 is within distance for D2D communication with the first wireless device 106A and that the second wireless device's 108A connection 110 to the cellular network is reliable, i.e. useful. This could be accomplished by comparing the vehicles' network connections and also their relative distance to the first vehicle 106 which may all be indicated in the platoon information.

In a further example embodiment, network address information of the second wireless device 108A may also be received from the leader vehicle 114, which enables the platoon manager 102 to forward the communication to the second wireless device 108A for further communication to the first wireless device 106A over the D2D link 112. In further example embodiments, the above network address information may include at least one of an IP address and a Mobile Station International Subscriber Directory Number, MSISDN, of the second wireless device 108A.

A further action 204 illustrates that the second wireless device 108A is somehow instructed to act as a relay to the cellular network for the communication with the first wireless device 106A by means of a D2D link 112 between the first and second wireless devices 106A 108A. This action may be performed implicitly by the platoon manager 102 sending a relay request to the leader vehicle 114 which then commands the vehicle 108 to act as the relay for the communication. Examples of such a procedure will be described below with reference to FIGS. 3 and 4. The platoon manager 102 could also send an explicit instruction directly to the second wireless device 108A. How this action 204 is performed may depend on where, i.e. in which entity, the relay vehicle 108 is appointed.

Some further embodiments that are possible to employ in the above-described procedure are as follows. In FIG. 1, the relay vehicle 108 and the leader vehicle 114 are illustrated as separate vehicles. Another possibility is that the leader vehicle 114 may itself be appointed to act as relay for the communication such that the relay vehicle 108 is the leader vehicle, in one example embodiment. For example, the leader vehicle 114 may be prioritized in this platoon 104 to act as relay vehicle whenever possible and required, such as when its wireless device's connection to the cellular network 100 is deemed to be sufficiently reliable and when the leader vehicle 114 is located within D2D distance to the first vehicle 106. If not, another vehicle in the platoon 104 could be appointed to act as the relay.

In another example embodiment, data packets may be forwarded in the communication over the platoon manager 102. Alternatively, the platoon manager 102 may only be involved in the establishment of the relay communication while the actual communication of data packets goes through the cellular network 100 without passing the platoon manager 102. In another example embodiment, the platoon manager 102 may be operating in a cloud environment, as mentioned above.

In another example embodiment, the communication may be initiated by a call request 118 received from a calling party 116 over the cellular network 100. In further example embodiments, the communication may comprise at least one of: a voice call, a video call, and delivery of content or a message or a notification. The solution described herein is however not limited to any particular type of calling party and/or ways of initiating and performing the communication as such.

An example of how the above solution may be realized in practice will now be described with reference to the signalling diagram in FIG. 3 involving a calling party 300, a platoon manager 302, a leader vehicle 304, a relay vehicle 306, a first vehicle 308 and a cellular network, not shown. These entities correspond to the calling party 116, the platoon manager 102, the leader vehicle 114, the relay vehicle 108, the first vehicle 106 and the cellular network 100 described for FIGS. 1, 1A and 2 above. Hence, the vehicles 304, 306 and 308 are comprised in a vehicle platoon. As mentioned earlier, it should be understood that any communication involving the vehicles is performed by means of wireless devices operating in the respective vehicles. In this example, the platoon manager 302 is involved in both the establishment of the communication and in the communication itself. All communication between the platoon manager 302 and the wireless devices in the vehicles is conducted over the cellular network.

A first action 3:1 illustrates that the platoon manager 302 obtains the above-described platoon information from the leader vehicle 304 of the platoon, and the dashed arrows further indicate that such information may be obtained more or less frequently, e.g. at regular intervals or whenever the platoon information has changed. This action may thus be executed "in the background" on a continuous basis so that the platoon information is kept up-to-date in the platoon manager 302. Alternatively or additionally, the platoon information may be provided when requested by the platoon manager 302, e.g. upon receiving a call request directed to a wireless device that has no connection to the cellular network.

The platoon manager 302 may also obtain corresponding platoon information from leader vehicles of other platoons as well, not shown, such that the platoon manager 302 acquires knowledge about a number of vehicle platoons and the vehicles comprised therein. When a platoon is disbanded the corresponding platoon information will be deleted in the platoon manager 302, e.g. after a preset timeout period or upon receiving a notification from the leader vehicle of that platoon.

Another action 3:2 indicates that the platoon manager 302 receives a call request originating from the calling party 300, which call request is directed to a called wireless device which happens to be located in the first vehicle 308. The call request indicates that the calling party 300 intends to send some content to the called wireless device. The call request is received via the cellular network which also indicates to the platoon manager 302 that the called wireless device cannot be found by the cellular network since it has no connection to the network.

The platoon manager 302 then searches the acquired platoon information and finds that the called wireless device is present in the first vehicle 308. The platoon manager 302 also identifies, in a following action 3:3, a vehicle platoon to which the first vehicle 308 belongs, based on the platoon information obtained in action 3:1. In a next action 3:4, the platoon manager 302 returns a confirmation to the calling party 300 basically indicating that the called wireless device has been found and that it can receive content. Thereby, the calling party 300 is triggered to send its content to the platoon manager 302, in a further action 3:5.

So far, the platoon manager 302 has recognized that the called wireless device is located in the first vehicle 308 which belongs to an identified vehicle platoon, and also knowing that the called wireless device has no connection to any cellular network. The platoon manager 302 has also received the content. However, no relay vehicle has yet been appointed, which is done as follows.

Having identified the vehicle platoon, the platoon manager 302 can also identify the leader vehicle 304 of the platoon and sends a relay request to that leader vehicle 304, in another action 3:6, thus requesting a relay to the cellular network for the called wireless device in the first vehicle 308. A next action 3:7 illustrates that it is the leader vehicle 304 in this case that selects, i.e. appoints, the relay vehicle 306, e.g. after negotiation with the other vehicles in the platoon or based on knowledge about the vehicles' current network connections and relative distances to the first vehicle 308.

A next action 3:8 illustrates that the leader vehicle 304 instructs the platoon manager 302 to send the content received in 3:5 to the selected relay vehicle 306. This instruction comprises the network address of the vehicle 306, e.g. an IP address or an MSISDN. Accordingly, the platoon manager 302 sends the content received in 3:5 to the selected relay vehicle 306, in a following action 3:9, and in a final action 3:6 the wireless device in the relay vehicle 306 sends the content to the wireless device in the first vehicle 308. Thereby, the wireless device in the first vehicle 308 has been enabled to communicate the content over the cellular network using the wireless device in the relay vehicle 306 as a relay, in this case the content also being forwarded by the platoon manager 302.

Yet another illustrative but non-limiting example of how the above solution may be realized when at least some of the above-described embodiments are used, will now be described with reference to the signalling diagram in FIG. 4 which shows an alternative procedure involving the same components and nodes as of FIG. 3. In this example, the platoon manager 302 is involved in the establishment of the communication but not in the communication itself, as opposed to the example of FIG. 3.

The actions 4:1-4:4 are performed in the same manner as described above for actions 3:1-3:4, which is therefore not necessary to repeat here. However, the calling party 300 is not triggered by the confirmation of action 4:4 to send its content to the platoon manager 302 which proceeds to find a relay vehicle by sending a relay request to the leader vehicle 304 of the identified platoon in an action 4:5. The leader vehicle 304 then selects the selects the relay vehicle in a next action 4:6. Actions 4:5 and 4:6 are performed in the same manner as described above for actions 3:6 and 3:7 which will not be repeated here.

A next action 4:7 illustrates that the leader vehicle 304 sends the network address, e.g. an IP address or MSISDN, of the wireless device in the relay vehicle 306, to the platoon manager 302 which then forwards the network address to the calling party 300 in another action 4:8. Thereby, the calling party 300 is able to send its content directly to the wireless device in the relay vehicle 306, in an action 4:9, and in a final action 4:10 the wireless device in the relay vehicle 306 sends the content to the wireless device in the first vehicle 308. Thereby, the wireless device in the first vehicle 308 has been enabled to communicate the content over the cellular network using the wireless device in the relay vehicle 306 as a relay.

Figure 5:
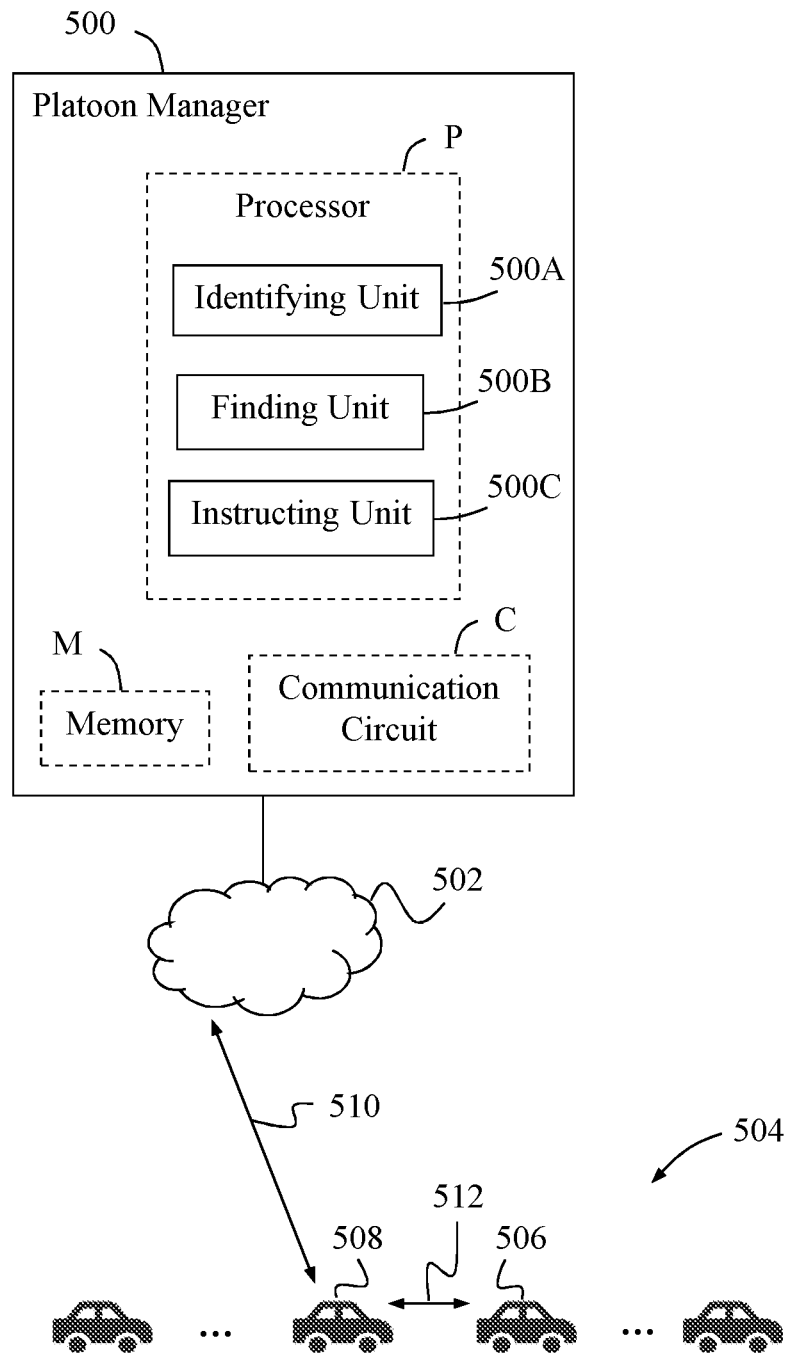
FIG. 5 is a block diagram illustrating a platoon manager in more detail, according to further possible embodiments.

The block diagram in FIG. 5 illustrates a detailed but non-limiting example of how a platoon manager 500 may be structured to bring about the above-described solution and embodiments thereof. The platoon manager 500 may be configured to operate according to any of the examples and embodiments of employing the solution as described above, where appropriate, and as follows. The platoon manager 500 is shown to comprise a processor P and a memory M, said memory comprising instructions executable by said processor P whereby the platoon manager 500 is operative as described herein. The platoon manager 500 also comprises a communication circuit C with suitable equipment for transmitting commands and receiving radio signals in the manner described herein.

The communication circuit C is configured for communication with wireless devices in a vehicle platoon using suitable protocols depending on the implementation. This communication may be performed in a conventional manner over a cellular network employing radio links for wireless communication with the wireless devices involved, which is not necessary to describe here as such in any detail. The solution and embodiments herein are thus not limited to using any specific types of technology or protocols for radio communication.

Figure 2:
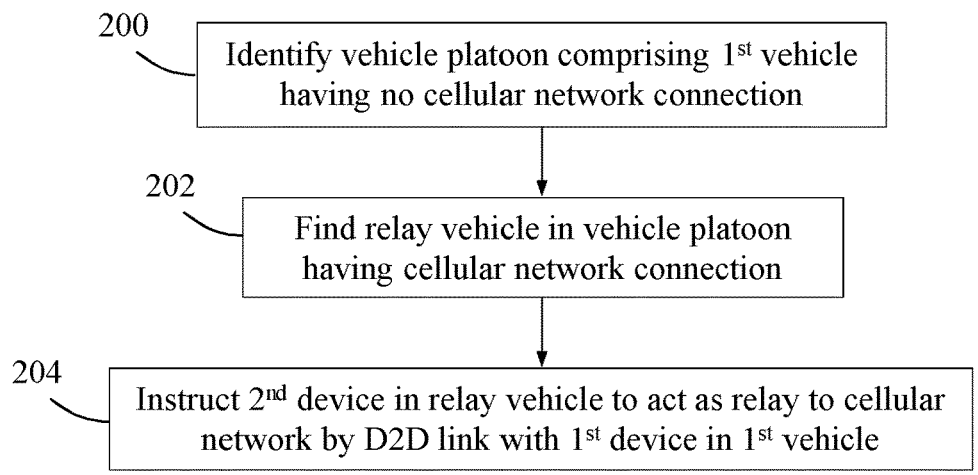
FIG. 2 is a flow chart illustrating a procedure for enabling communication over a cellular network with a first wireless device located in a first vehicle, according to further possible embodiments.
Figure 3:
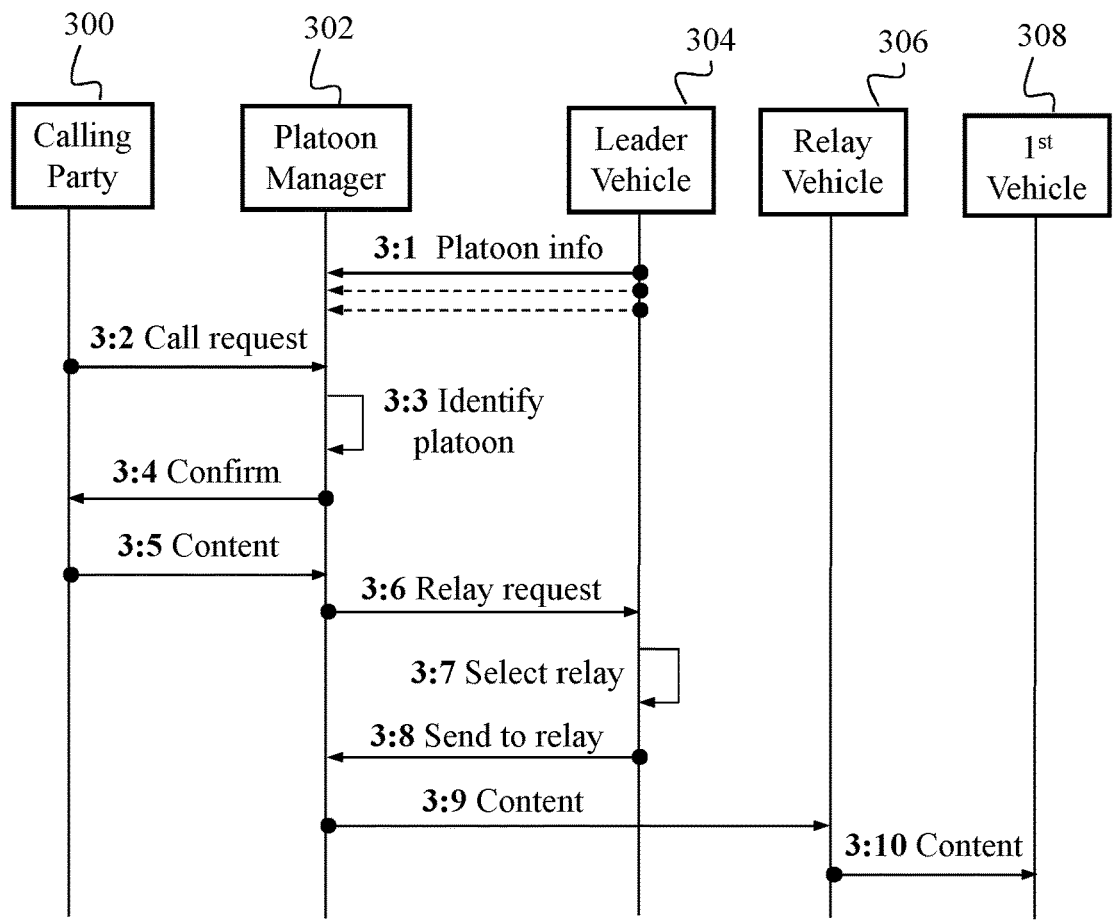
FIG. 3 is a signaling diagram illustrating an example of a communication procedure when the solution is used, according to further possible embodiments.
Figure 4:
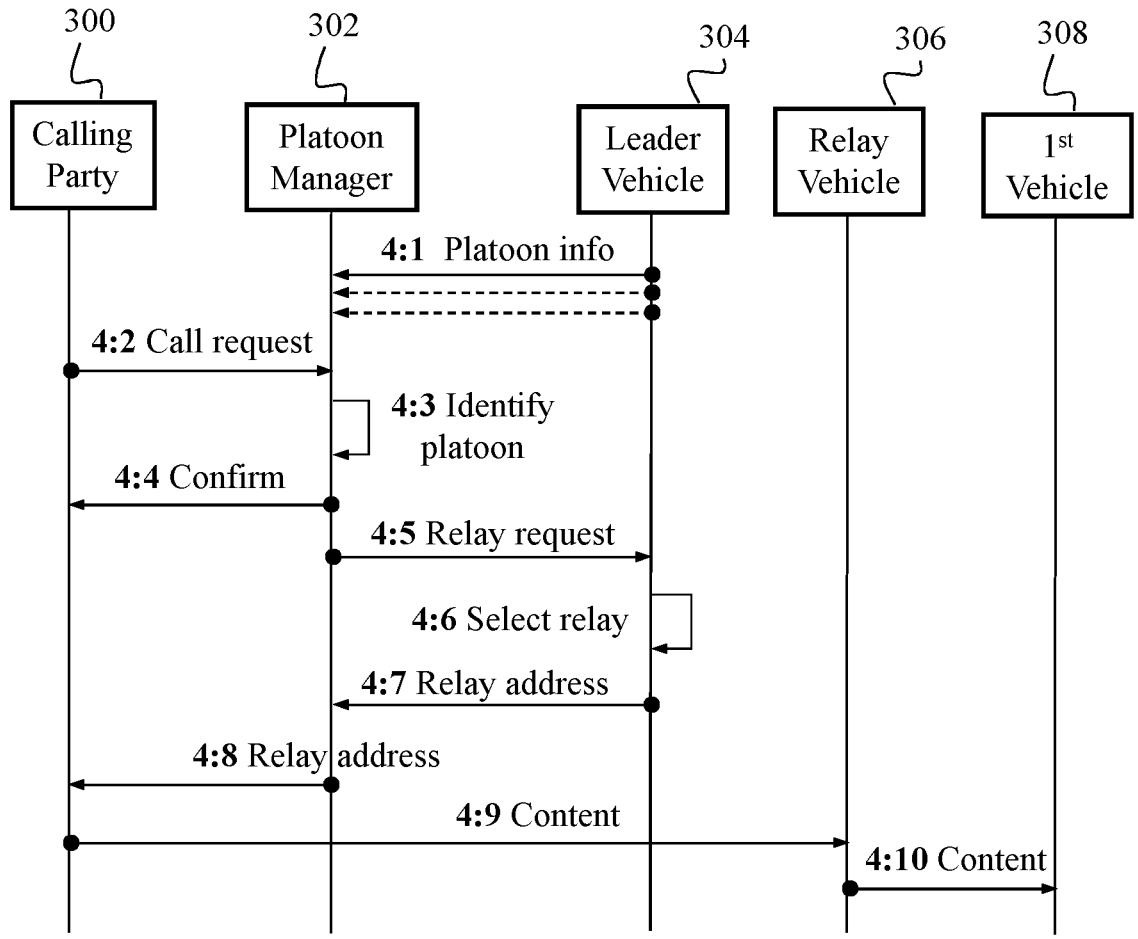
FIG. 4 is a signaling diagram illustrating another example of a communication procedure when the solution is used, according to further possible embodiments.

The platoon manager 500 comprises means configured or arranged to perform at least the actions 200-204 of the flow chart in FIG. 2, and optionally also in accordance with any of the examples shown in FIGS. 3 and 4. The platoon manager 500 is arranged to enable a first wireless device located in a first vehicle 506 to communicate over a cellular network 502 when the first wireless device has no connection to the cellular network.

The platoon manager 500 is configured to identify a vehicle platoon 504 to which the first vehicle 506 belongs. This operation may be performed by an identifying unit 500A in the platoon manager 500, e.g. in the manner described for action 200 above. The platoon manager 500 is further configured to find a relay vehicle 508 in the vehicle platoon where a second wireless device, not shown, is located that has a connection 510 to the cellular network. This finding operation may be performed by a finding unit 500B in the platoon manager 500, e.g. as described for action 202 above.

The platoon manager 500 is also configured to instruct the second wireless device to act as a relay to the cellular network for the communication with the first wireless device by means of a wireless Device-to-Device, D2D, link 512 between the first and second wireless devices. This instructing operation may be performed by an instructing unit 500C in the platoon manager 500, e.g. as described for action 204 above.

It should be noted that FIG. 5 illustrates various functional units in the platoon manager 500, and the skilled person is able to implement these functional units in practice using suitable software and hardware. Thus, the solution is generally not limited to the shown structures of the platoon manager 500, and the functional units 500A-C therein may be configured to operate according to any of the features and embodiments described in this disclosure, where appropriate.

The functional units 500A-C described above can be implemented in the platoon manager 500 by means of suitable hardware and program modules of a computer program comprising code means which, when run by the processor P causes the platoon manager 500 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the platoon manager 500 in the form of a memory having a computer readable medium and being connected to the processor P. The computer program product or memory in the platoon manager 500 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the platoon manager 500.

The solution described herein may be implemented in the platoon manager 500 by means of a computer program storage product comprising instructions which, when executed on at least one processor, cause the at least one processor to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "platoon manager", "relay vehicle", "leader vehicle", "D2D link" and "cloud environment" have been used throughout this disclosure, although any other corresponding entities, functions, and/or parameters could also be used having the features and characteristics described here. The solution is defined by the appended claims.

The invention claimed is:

1. A method for enabling a first wireless device located in a first vehicle to communicate over a cellular network when the first wireless device has no connection to the cellular network, the method comprising:
   identifying a vehicle platoon to which the first vehicle belongs where the vehicle platoon is identified based on platoon information obtained from a leader vehicle in the vehicle platoon, said platoon information indicating at least which vehicles are currently included in the vehicle platoon and wireless devices that are present in said vehicles,
   finding a relay vehicle in the vehicle platoon where a second wireless device is located that has a connection to the cellular network, and
   instructing the second wireless device to act as a relay to the cellular network for communication with the first wireless device by means of a wireless Device-to-Device, D2D, link between the first and second wireless devices.

2. The method according to claim 1, wherein the communication is initiated by a call request received from a calling party over the cellular network.

3. The method according to claim 1, wherein the relay vehicle is found when suggested from a vehicle in the vehicle platoon.

4. The method according to claim 1, wherein the relay vehicle is appointed based on the obtained platoon information.

5. The method according to claim 4, wherein the relay vehicle is appointed when the platoon information indicates that the relay vehicle is within distance for D2D communication with the first wireless device and that the second wireless device's connection to the cellular network is reliable.

6. The method according to claim 1, wherein network address information of the second wireless device is received from the leader vehicle.

7. The method according to claim 6, wherein the network address information includes at least one of an IP address and a Mobile Station International Subscriber Directory Number, MSISDN.

8. The method according to claim 1, wherein the relay vehicle is the leader vehicle.

9. The method according to claim 1, wherein the method is performed by a platoon manager connected to the cellular network.

10. The method according to claim 9, wherein data packets are forwarded in the communication over the platoon manager.

11. The method according to claim 1, wherein the communication comprises at least one of: a voice call, a video call, and delivery of content or a message or a notification.

12. A platoon manager arranged to enable a first wireless device located in a first vehicle to communicate over a cellular network when the first wireless device has no connection to the cellular network, wherein the platoon manager comprises:
   a communication circuit;
   memory; and
   a processor associated with the communication circuit and the memory and configured to:
      identify a vehicle platoon to which the first vehicle belongs where the vehicle platoon is identified based on platoon information obtained from a leader vehicle in the vehicle platoon, said platoon information indicating at least which vehicles are currently included in the vehicle platoon and wireless devices that are present in said vehicles,
      find a relay vehicle in the vehicle platoon where a second wireless device is located that has a connection to the cellular network, and
      instruct the second wireless device to act as a relay to the cellular network for communication with the first wireless device by means of a wireless Device-to-Device, D2D, link between the first and second wireless devices.

13. The platoon manager according to claim 12, wherein the communication is initiated by a call request received from a calling party over the cellular network.

14. The platoon manager according to claim 12, wherein the processor is configured to find the relay vehicle when suggested from a vehicle in the vehicle platoon.

15. The platoon manager according to claim 12, wherein the processor is configured to appoint the relay vehicle based on the obtained platoon information.

16. The platoon manager according to claim 15, wherein the processor is configured to appoint the relay vehicle when the platoon information indicates that the relay vehicle is within distance for D2D communication with the first wireless device and that the second wireless device's connection to the cellular network is reliable.

17. The platoon manager according to claim 12, wherein the processor is configured to receive network address information of the second wireless device from the leader vehicle.

18. The platoon manager according to claim 17, wherein the network address information includes at least one of an IP address and a Mobile Station International Subscriber Directory Number, MSISDN.

19. The platoon manager according to claim 12, wherein the relay vehicle is the leader vehicle.

20. The platoon manager according to claim 12, wherein the communication circuit is operable to be connected to the cellular network.

21. The platoon manager according to claim 20, wherein the processor is configured to forward data packets in the communication.

22. The platoon manager according to claim 12, wherein the communication comprises at least one of: a voice call, a video call, and delivery of content or a message or a notification.

* * * * *